United States Patent Office.

CORNELIUS J. CURTIN, OF NEWARK, NEW JERSEY.

PROCESS OF MAKING SLAG CEMENT.

SPECIFICATION forming part of Letters Patent No. 606,278, dated June 28, 1898.

Application filed October 27, 1897. Serial No. 656,607. (No specimens.)

*To all whom it may concern:*

Be it known that I, CORNELIUS J. CURTIN, of the city of Newark, county of Essex, and State of New Jersey, have invented a new and useful Process of Making Slag Cement, of which the following is a specification.

This invention relates to a process for making high-grade slag cement from slag by the use of hydrochloric acid, as will be hereinafter specified.

The object of my invention is to create by the combination of hydrochloric acid with the lime a more thorough mixture of the parts, and thereby make a very much stronger and smoother cement, which mixes more readily and gives much better satisfaction in use.

The formula and process of making cement under my invention are as follows: I take any given quantity of lime and add thereto about three per cent. of hydrochloric acid, these parts being thoroughly mixed while the acid is being added to the lime. The action of the acid on the lime causes it to mix more readily with the slag when added. After these parts are thoroughly combined the mixture is deposited in a vat of water containing about twenty per cent. of water to the quantity of mixture deposited therein. These parts are again thoroughly mixed and molten slag is permitted to run therein until about eighty-five per cent. is deposited, or until the requisite consistency is obtained. It must be understood that the process of mixing continues and is continued until the whole is thoroughly mixed and combined, after which it is drawn off and dried and then pulverized into a very fine powder by any of the usual methods.

In some cases I find it is an advantage to mix the water and lime first, then add the acid, and then the slag in about the same proportions as above stated, the percentages being those of weight.

Having thus described my invention, what I claim, and desire to secure by Letters Patent of the United States, is—

The process herein described for making slag cement, which consists in adding to burnt lime three per cent. of hydrochloric acid, then immersing the same in about twenty per cent. water, then thoroughly mixing the same and combining therewith eighty-five per cent. molten slag, then drying and pulverizing the same, substantially as described.

In testimony that I claim the foregoing improved process for making slag cement as above described I have hereunto set my hand this 21st day of October, 1897.

CORNELIUS J. CURTIN.

Witnesses:
C. L. MALCOLM,
R. H. INCH.